United States Patent
Dommer

(10) Patent No.: US 7,959,142 B2
(45) Date of Patent: Jun. 14, 2011

(54) CLAMPING DEVICE FOR CLAMPING PIPES, PARTICULARLY ON BUTT WELDING MACHINES

(75) Inventor: Martin Dommer, Ditzingen-Heimerdingen (DE)

(73) Assignee: Armin Dommer and Dieter Dommer, Ditzingen (DE)

( * ) Notice: Subject to any disclaimer, the term of this patent is extended or adjusted under 35 U.S.C. 154(b) by 427 days.

(21) Appl. No.: 12/176,503

(22) Filed: Jul. 21, 2008

(65) Prior Publication Data

US 2009/0045563 A1 Feb. 19, 2009

(30) Foreign Application Priority Data

Jul. 20, 2007 (DE) .......................... 10 2007 033 939

(51) Int. Cl.
*B25B 5/10* (2006.01)
(52) U.S. Cl. .............. 269/243; 269/43; 269/45
(58) Field of Classification Search ............... 269/243, 269/43, 45, 71, 247, 291, 280; 248/65, 74.1, 248/74.4, 228.5; 81/421–423, 185.1
See application file for complete search history.

(56) References Cited

U.S. PATENT DOCUMENTS

| | | | | |
|---|---|---|---|---|
| 1,055,757 A * | 3/1913 | Ling | ........................ | 81/185.1 |
| 1,112,192 A * | 9/1914 | Callan | ........................ | 269/221 |
| 3,097,843 A * | 7/1963 | Morrow | ........................ | 269/40 |
| 3,414,950 A * | 12/1968 | Phariss | ........................ | 24/280 |
| 3,596,898 A * | 8/1971 | Hilburn | ........................ | 269/243 |
| 4,750,662 A * | 6/1988 | Kagimoto | ........................ | 228/44.5 |
| 4,865,300 A * | 9/1989 | Borzym | ........................ | 269/13 |
| 5,165,160 A * | 11/1992 | Poncelet | ........................ | 29/464 |
| 5,727,778 A * | 3/1998 | Nodar | ........................ | 269/43 |
| 5,770,006 A * | 6/1998 | Andrew et al. | ........................ | 156/499 |

* cited by examiner

*Primary Examiner* — George Nguyen
(74) *Attorney, Agent, or Firm* — Browdy and Neimark, PLLC

(57) ABSTRACT

Proposed is a clamping device for clamping pipes, particularly plastic pipes for welding on butt welding machines. A base part (10) and a clamping lid (11) that is removable from the same or can be pivoted away from the same each have, to receive a pipe, a receptacle channel (13, 14) with circle segment-shaped cross section, whose circle segment radius is matched to the pipe radius. To provide for clamping also pipes with a smaller radius, at least one clamping insert is provided that is fixable in the receptacle channel (13) of the base part (10) and consists of an insert base part (23) and an insert clamping lid (25) that is removable from the same or can be pivoted away from the same, whose receptacle channels (30, 31) have a circle segment-shaped cross section with a smaller circle segment radius than that of the base part (10). Accordingly, when clamping smaller pipes the usually very heavy clamping lid (11) does not need to be provided with inserts and does not need to be pivoted.

8 Claims, 2 Drawing Sheets

CLAMPING DEVICE FOR CLAMPING PIPES, PARTICULARLY ON BUTT WELDING MACHINES

Figure 1:
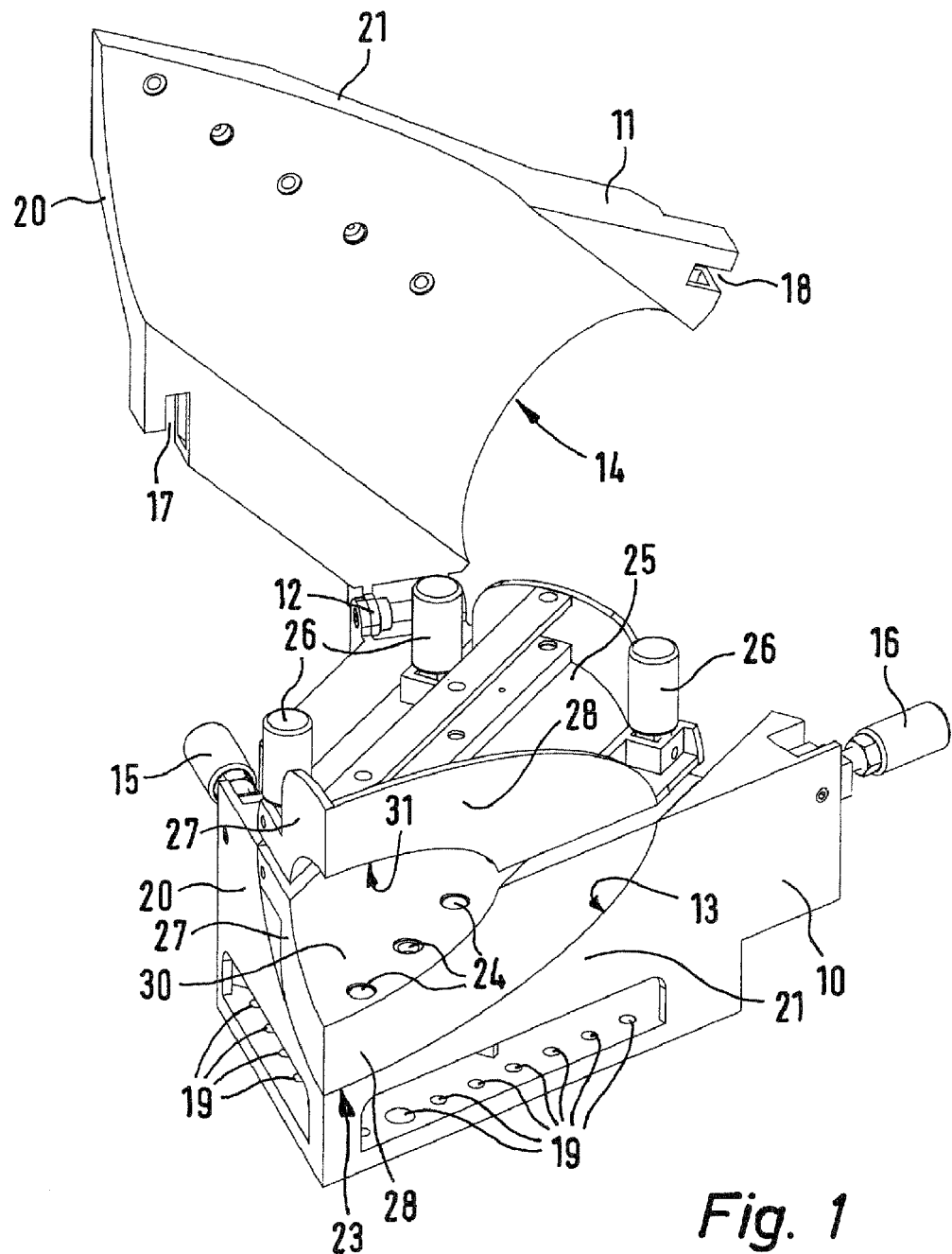

The invention relates to a clamping device for clamping pipes, particularly plastic pipes for welding on butt welding machines, comprising a base part and a clamping lid that is removable from the same or can be pivoted away from the same, each having, to receive a pipe, a receptacle channel with circle segment-shaped cross section whose circle segment radius is matched to the pipe radius, and comprising means for also clamping pipes with a smaller radius.

Clamping devices of this type are required particularly for clamping two plastic pipes that are to be welded together on butt welding machines, like they are known, for example, from EP 0453903 B1. The two pipes that are to be welded together are clamped into two such clamping devices that can be moved relative each other, then machined at their face ends with a mill, then moved against a heating surface and, after the same is pivoted out, pressed against each other with their face ends, during which process the heated material is fused.

The clamping devices consist of a lower base part and an upper clamping lid that is clamped against the base part with the pipe located in-between. The diameter of the clamping orifice or clamping channel must match that of the pipe. In order to be able to clamp pipes with different diameters, either the clamping devices must be exchanged, or half-shell shaped inserts are fixed in the base part and in the clamping lid, in order to reduce the clamping radius for smaller pipes. This initially appears unproblematic, especially in the case of pipes with small diameters at low clamping forces. It becomes problematic only when the clamping devices are for very large diameters at very high clamping forces. Such clamping devices are very voluminous and heavy. If, additionally, reduction inserts are inserted for smaller diameter pipes, the clamping lid can become so heavy that it can no longer be taken off or pivoted away by one person.

One object of the invention, therefore, lies in creating a clamping device of the type mentioned at the beginning, in which clamping is possible with significantly less effort even in the case of very large and heavy embodiments with a pipe reduction.

This object is met according to the invention by a clamping device having the characteristics of claim 1.

The inventive clamping device has the advantage in particular that the clamping lid no longer needs to be provided with inserts and no longer needs to be moved when pipes with a smaller diameter are clamped. The reduction inserts in the receptacle channel of the base part have an insert base part of their own and an insert clamping lid of their own that is accordingly smaller and therefore easier to move. The clamping lid of the base part now needs to be moved only when pipes with maximally possible radius are clamped that matches the circle segment radius. Manipulation is thereby made easier and when pipes of smaller diameters are worked on with the clamping lid pivoted away, the view of the pipes to be welded is improved.

The measures specified in the subclaims permit advantageous further developments and improvements of the clamping device specified in claim 1.

In order to be able to clamp pipes with different diameters or radii in the same clamping device, a plurality of different clamping inserts with different circle segment radii are advantageously exchangeably fixable in the receptacle channel of the base part. To provide for fixing the at least one clamping insert in the receptacle channel of the base part, a threaded connection is advantageously provided.

To provide for tightening the clamping lid on the base part and/or tightening the insert clamping lid on the insert base part, tightening bolts or eccentric clamping elements are particularly suitable.

The at least one insert base part is preferably designed half-shell-like and has an outer radius that matches the circle segment radius of the base part, to permit insertion into the base part with true fit.

The base part advantageously has fixing means for fixing to a fixing surface, which are designed particularly as threaded fixing means. The base part preferably has a substantially flat underside, whereas the upper side is provided with the receptacle channel.

The orifices of the receptacle channels may, depending on whether two pipes are to be welded together in axial alignment or at a certain angle, be situated in a plane perpendicular to the longitudinal direction of the receptacle channels and/or at least in one inclined plane relative to the longitudinal direction of the receptacle channels.

Figure 2:
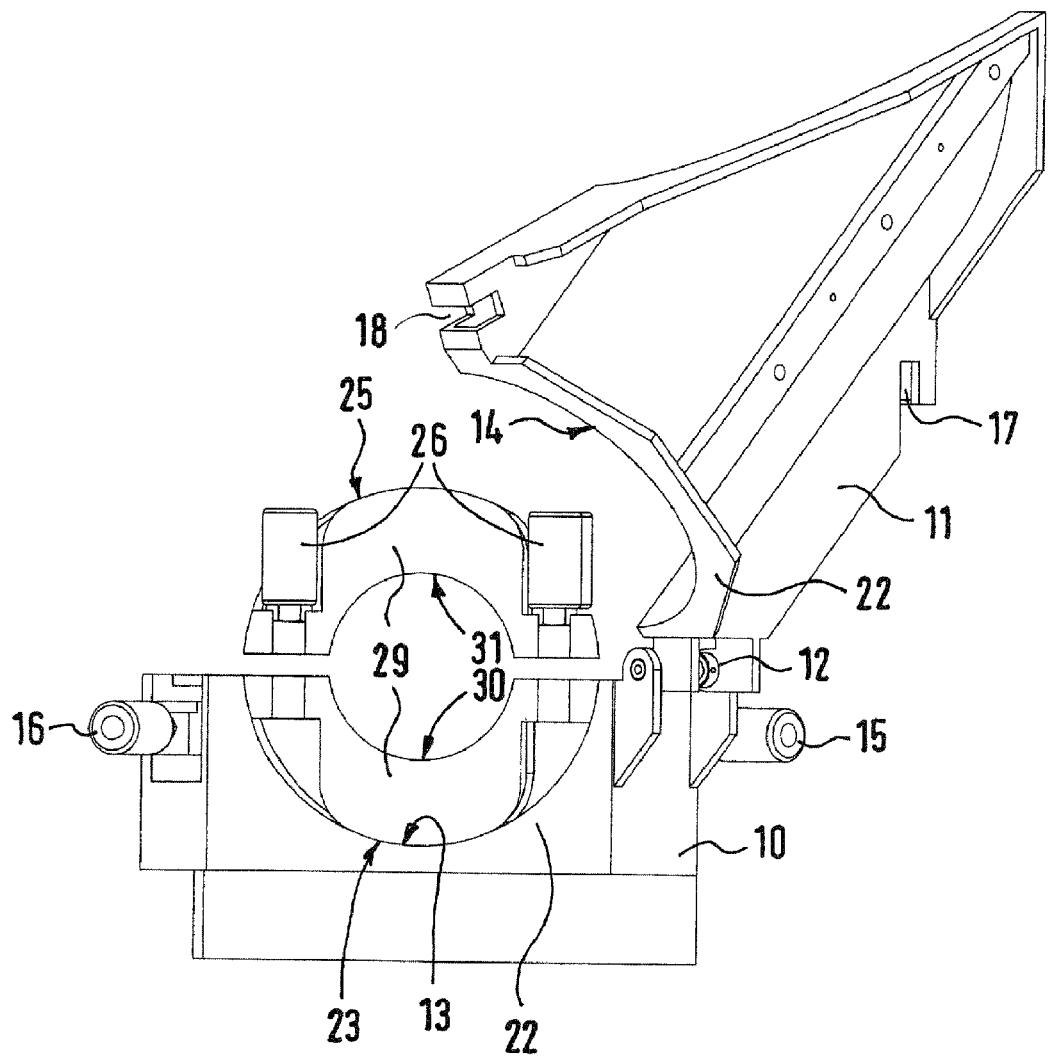

An exemplary embodiment of the invention is shown in the drawing and explained in more detail in the description that follows. In the drawing FIG. 1 shows a clamping device with open clamping lid and inserted insert base part, whose insert clamping lid is closed, in a perspective rendering diagonally from the front, and FIG. 2 shows the same clamping device in a view from behind.

The clamping device shown in the figures has a base part 10, on which a clamping lid 11 is pivot-mounted via a pivot hinge 12. The base part 10 and the clamping lid 11 each have a receptacle channel 13, 14 with circle segment-shaped cross section, so that a not depicted pipe whose radius matches the circle segment radius of the receptacle channels 13, 14 can be clamped between them. For this, the clamping lid 11 is closed, two pivotable tightening bolts 15, 16 on the base part 10 are pivoted into matching receptacle slots 17, 18 on the clamping lid 11, and by turning the tightening bolts 15, 16, the pipe is fixed or clamped between the base part 10 and clamping lid 11.

A clamping device of this type, together with an another matching clamping device, serves for clamping, for example, two plastic pipes that are to be welded together on the table of a not depicted butt welding machine like it is schematically described in the prior art that was mentioned at the beginning. To provide for fixing the base part 10 on such a table or other subsurface or other clamping surface, the base part 10 has on its flat underside a plurality of holding bores 19 for accommodating not depicted holding screws whereby fixing to the table or other fastening surface is possible.

The frontal orifice of the pipe holding receptacle formed by the two receptacle channels 13, 14, has two orifice surfaces 20, 21 disposed at an angle to each other, which themselves, in turn, are disposed not perpendicular to the longitudinal direction of the pipe holding receptacle. In this manner two pipes that are to be welded together can be positioned at two different angles to each other, for example at an angle of 90° if one orifice surface 20 takes an angle of 45° to the longitudinal direction of the pipe holding receptacle, or at an angle of 60°, if the other orifice surface 21 takes an angle of 30° to the longitudinal direction of the pipe holding receptacle. Depending on the application, orifice surfaces 20, 21 with desired angles may be provided, and the frontal orifice surface of the pipe holding receptacle may, for example, also take altogether only a single angle to the longitudinal direction of the pipe holding receptacle.

The rearward orifice surface 22 of the pipe holding receptacle is disposed perpendicular to the longitudinal direction of the pipe holding receptacle in order, for example, to weld together two pipes in axial alignment. The rearward orifice surface, too, may take a single or two different angles to the longitudinal direction of the pipe holding receptacle; or both the frontal orifice surface as well as the rearward orifice surface are disposed perpendicular to the longitudinal direction of the pipe holding receptacle.

In order to be able to clamp pipes with a smaller pipe diameter, an insert base part 23 is inserted in the receptacle channel 13 of the base part 10 and screwed to the base part 10 by means of not depicted holding screws that are inserted or insertable into holding bores 24. Other known fixing methods, such as for example a snap-in mechanism, are possible as well.

On the insert base part 23, an insert clamping lid 15 is tightened by means of three tightening bolts 26. These tightening bolts 26 may also be designed correspondingly pivotable, like the tightening bolts 15, 16; also, eccentric tightening elements, for example, may be used in lieu of tightening bolts. The insert base part 23 is designed half-shell shaped, with the outer radius matching that of the receptacle channel 13, so that the insert base part 23 is securely fixable in the receptacle channel 13 in a form-fitting manner. The angles of the frontal orifice surfaces 27, 28 and rear orifice surface 29 of a pipe holding receptacle formed between the insert base part 23 and the clamping lid 25 match those of the orifice surfaces 20-22 of the base part 10 and clamping lid 11, respectively. The pipe holding receptacle of the insert base part 23 provided with the insert clamping lid 25, in turn, is formed by two receptacle channels 30, 31 in the insert base part 23 and in the insert clamping lid 25.

For clamping pipes with a smaller diameter, the clamping lid 11 is pivoted away, the insert base 23 is fixed in the receptacle channel 13 of the base part 10, the smaller pipe is inserted and clamped by means of the insert clamping lid 25 by tightening the tightening bolts 26.

In order to be able to clamp smaller pipes with different pipe diameters, different insert base parts 23 may be provided that are each equipped with their own insert clamping lid 25 and that have receptacle channels 30, 31 with different circle segment radii. It is also possible, in principle, in analogous manner, to insert into an insert base part 23 or to fix in the same an even smaller insert base part with its own insert clamping lid. Other diameter reduction devices in the insert base part 23 or in the insert clamping lid 25, respectively, are possible as well. The essence in this context is that the very large and—in the case of large diameters—very heavy clamping lid 11 does not need to be provided with inserts that make it even heavier and that it does not need to be pivoted in order to clamp smaller pipes.

In the presented exemplary embodiment the clamping lid 11 is disposed pivotable on the base part 10, whereas the insert clamping lid 25 can be completely removed after loosening and pivoting away the tightening bolts 26. Both variants, however, may be provided as desired for the clamping lid 11 and for the insert clamping lid 25.

What is claimed is:

1. A clamping device for clamping pipes, optionally plastic pipes for welding on butt welding machines, comprising
    a base part and a clamping lid that is removable from the base part or can be pivoted away from the base part,
    each having, to receive a pipe, a receptacle channel with circle segment-shaped cross section whose circle segment radius is matched to the pipe radius, and comprising means for also clamping pipes with a smaller radius, characterized in that
    at least one clamping insert that is fixable in the receptacle channel (13) of the base part (10) has an insert base part (23) and an insert clamping lid (25) that is removable or can be pivoted away from the insert base part, whose receptacle channels (30, 31) have a circle segment-shaped cross section with a circle-segment radius smaller than that of the base part (10).

2. A clamping device according to claim 1, characterized in that a plurality of different clamping inserts with different circle segment radii are exchangeably fixable in the receptacle channel (13) of the base part (10).

3. A clamping device according to claim 1, characterized in that a threaded connection (24) is provided for fixing the at least one clamping insert in the receptacle channel (13) of the base part (10).

4. A clamping device according to claim 1, characterized in that tightening bolts (15, 16, 26) are provided for tightening the clamping lid (11) on the base part (10) and/or the insert clamping lid (25) on the insert base part (23).

5. A clamping device according to claim 1, characterized in that the at least one insert base part (23) is a half-shell and has an outer radius that matches the circle segment radius of the receptacle channel (13) in the base part.

6. A clamping device according to claim 1, characterized in that the base part has fixing means (19) for fixing to a fixing surface, which are designed particularly as threaded fixing means.

7. A clamping device according to claim 6, characterized in that the base part (10) has a substantially flat underside, whereas the upper side is provided with the receptacle channel (13).

8. A clamping device according to claim 1, characterized in that orifices of the receptacle channels (13, 14, 30, 31) are located in a plane perpendicular to the longitudinal direction of the receptacle channels (13, 14, 30, 31).

* * * * *